United States Patent
Murphy et al.

(10) Patent No.: US 7,810,284 B2
(45) Date of Patent: Oct. 12, 2010

(54) VEHICLE WINDOW ASSEMBLY

(75) Inventors: James M. Murphy, Lansing, MI (US); David B. Snyder, Lapeer, MI (US); Michell R. Shippy, Oxford, MI (US); Michael M. Norrito, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 523 days.

(21) Appl. No.: 11/741,899

(22) Filed: Apr. 30, 2007

(65) Prior Publication Data

US 2008/0263960 A1    Oct. 30, 2008

(51) Int. Cl.
*E06B 1/00*    (2006.01)

(52) U.S. Cl. .............................. 49/380; 49/408; 49/413; 52/209

(58) Field of Classification Search .................... 49/116, 49/118, 123, 380, 408, 413; 52/204.54, 209
See application file for complete search history.

(56) References Cited

U.S. PATENT DOCUMENTS

| | | | | |
|---|---|---|---|---|
| 3,845,599 A | * | 11/1974 | Jolly | 52/209 |
| 4,003,171 A | * | 1/1977 | Mitchell | 52/209 |
| 4,042,004 A | * | 8/1977 | Kwan | 160/91 |
| 4,125,141 A | * | 11/1978 | Stillwell | 160/91 |
| 4,553,361 A | * | 11/1985 | Ralph | 52/209 |
| 4,934,098 A | * | 6/1990 | Prouteau et al. | 49/214 |
| 5,123,212 A | * | 6/1992 | Dallaire et al. | 52/209 |
| 5,799,444 A | * | 9/1998 | Freimark et al. | 49/413 |
| 5,996,284 A | * | 12/1999 | Freimark et al. | 49/209 |
| 6,205,724 B1 | * | 3/2001 | Garling et al. | 52/209 |
| 6,370,830 B1 | * | 4/2002 | Bjorkman | 52/235 |
| 6,883,279 B2 | * | 4/2005 | Fukuro et al. | 52/209 |
| 7,246,466 B2 | * | 7/2007 | Turner | 49/504 |

* cited by examiner

*Primary Examiner*—Jerry Redman
(74) *Attorney, Agent, or Firm*—Quinn Law Group, PLLC

(57) ABSTRACT

A vehicle window assembly, preferably for the rear of a pickup cab having a sliding glass member, is provided with a window frame molding having an integrated fluid inlet, fluid outlet and circuitous flow channel that doubles back on itself and connects the fluid inlet with the fluid outlet to permit fluid flow through the molding, thereby permitting water that has entered through the sliding glass member to drain from interior compartment to the outside of the vehicle while minimizing the introduction of road and wind noise in the interior compartment.

9 Claims, 6 Drawing Sheets

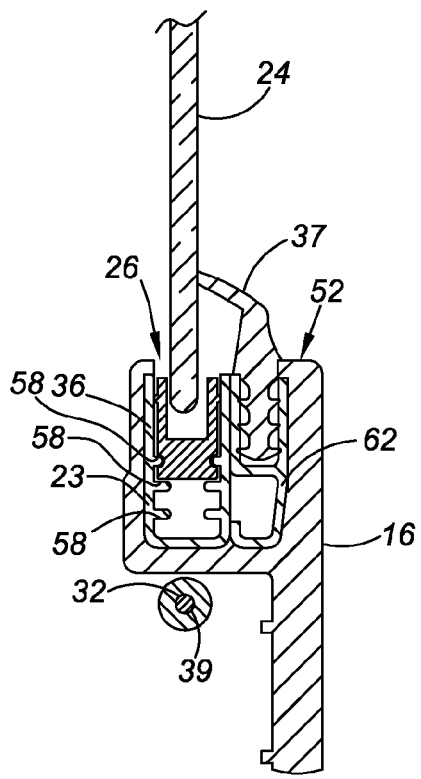
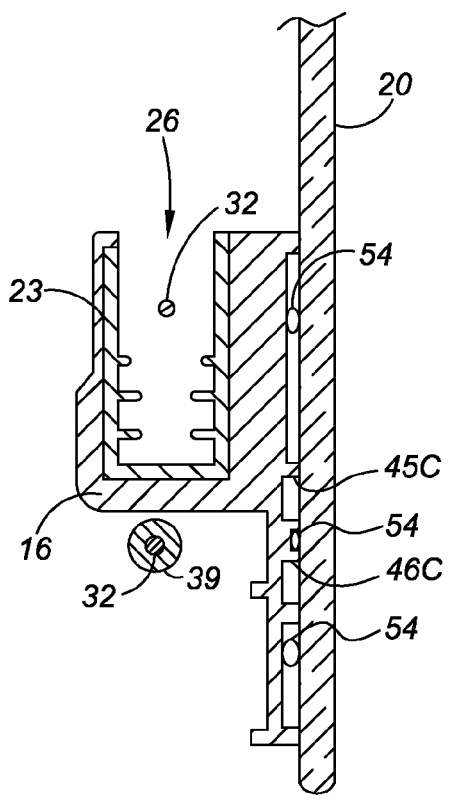
FIG. 7
FIG. 8
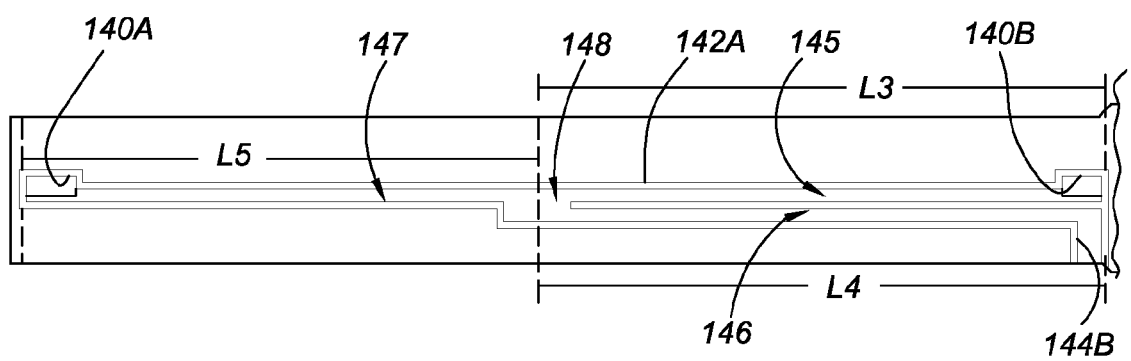
FIG. 9

US 7,810,284 B2

VEHICLE WINDOW ASSEMBLY

TECHNICAL FIELD

The invention relates to a vehicle window assembly having a molding with a channel for draining fluid through the molding.

BACKGROUND OF THE INVENTION

Vehicles, such as pickup trucks often have a sliding glass panel at the rear of the cab. An open sliding glass panel typically permits water to enter the cab interior compartment, whether entering through the window opening or by running down the glass panel into the compartment. Water that has entered the interior compartment must be directed outside of the cab, without creating objectionable road noise or wind noise in the interior compartment.

SUMMARY OF THE INVENTION

A vehicle window assembly, preferably for the rear of a pickup cab, is provided with a window frame molding having an integrated fluid inlet, fluid outlet and circuitous flow channel. The flow channel doubles back on itself and connects the fluid inlet with the fluid outlet to permit fluid flow through the molding. Preferably, the inlet is within an interior compartment of the vehicle cab, the outlet is outside of the cab, and the flow channel winds between and connects the inlet with the outlet to permit fluid flow from the interior compartment to the outside of the cab through the molding, thereby allowing water that has entered the interior compartment through a sliding glass member of the vehicle window assembly to be expelled.

Preferably, the vehicle window assembly includes a stationary glass member abutting the window molding to further define the flow channel as well as to further define the cab interior compartment. Sealing material, such as a urethane adhesive, may be used to seal the stationary glass member to the window molding, especially around the flow channels. A structural support member supports the stationary glass member and is partially surrounded by the molding above the flow channel. The structural support member forms a window channel that has an outlet opening in fluid communication with the fluid inlet of the window molding. A movable glass member is slidable within the window channel of the structural support member to open the interior compartment to the outside. Water entering the interior compartment that collects in the window channel can drain through the opening in the structural support member to the fluid inlet, flow channel and fluid outlet of the window molding.

In one embodiment, the flow channel includes a first leg forming the fluid inlet, a second leg generally parallel with the first leg and forming the fluid outlet, and a bend or elbow connecting the first and second legs. The bend may be midway between the inlet and outlet. Such a circuitous flow channel permits necessary drainage while minimizing road noise and wind noise entering the interior compartment via the inlet, outlet, i.e., the fluid flow path between the fluid inlet and the fluid outlet, and flow channel. Preferably, the length of the flow channel between the fluid inlet and the fluid outlet is not less than 100 millimeters, as this length has demonstrated substantial noise minimization.

In one embodiment, the molding further defines an additional fluid inlet positioned within the vehicle cab when the window assembly is installed on a vehicle, as well as a third leg fluidly connecting the additional fluid inlet with the bend of the first flow channel to permit fluid flow from the additional fluid inlet to the fluid outlet.

In another embodiment, the window frame molding further defines an additional fluid inlet, an additional fluid outlet, and an additional circuitous flow channel that doubles back on itself to connect the additional inlet with the additional outlet and permit fluid flow through the molding. In such an embodiment, the molding may further define a separating wall that separates the first flow channel from the second flow channel. A stationary glass member that abuts the window molding further defines the flow channels. There is no sealing material between the separating wall and the stationary glass member in order to allow overflow drainage from one of the flow channels to seep past the separating wall to the other flow channel.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 7 is a schematic cross-sectional illustration in fragmentary view of the rear window assembly of FIG. 1 taken at the arrows 7-7 indicated in FIG. 1;

FIG. 8 is a schematic cross-sectional illustration in fragmentary view of the rear window assembly of FIG. 1 taken at the arrows 8-8 indicated in FIG. 1;

FIG. 9 is a schematic illustration in fragmentary rear view of an alternative circuitous flow channel for use in the vehicle window assembly of FIG. 1.

DESCRIPTION OF THE PREFERRED EMBODIMENTS

Figure 1:
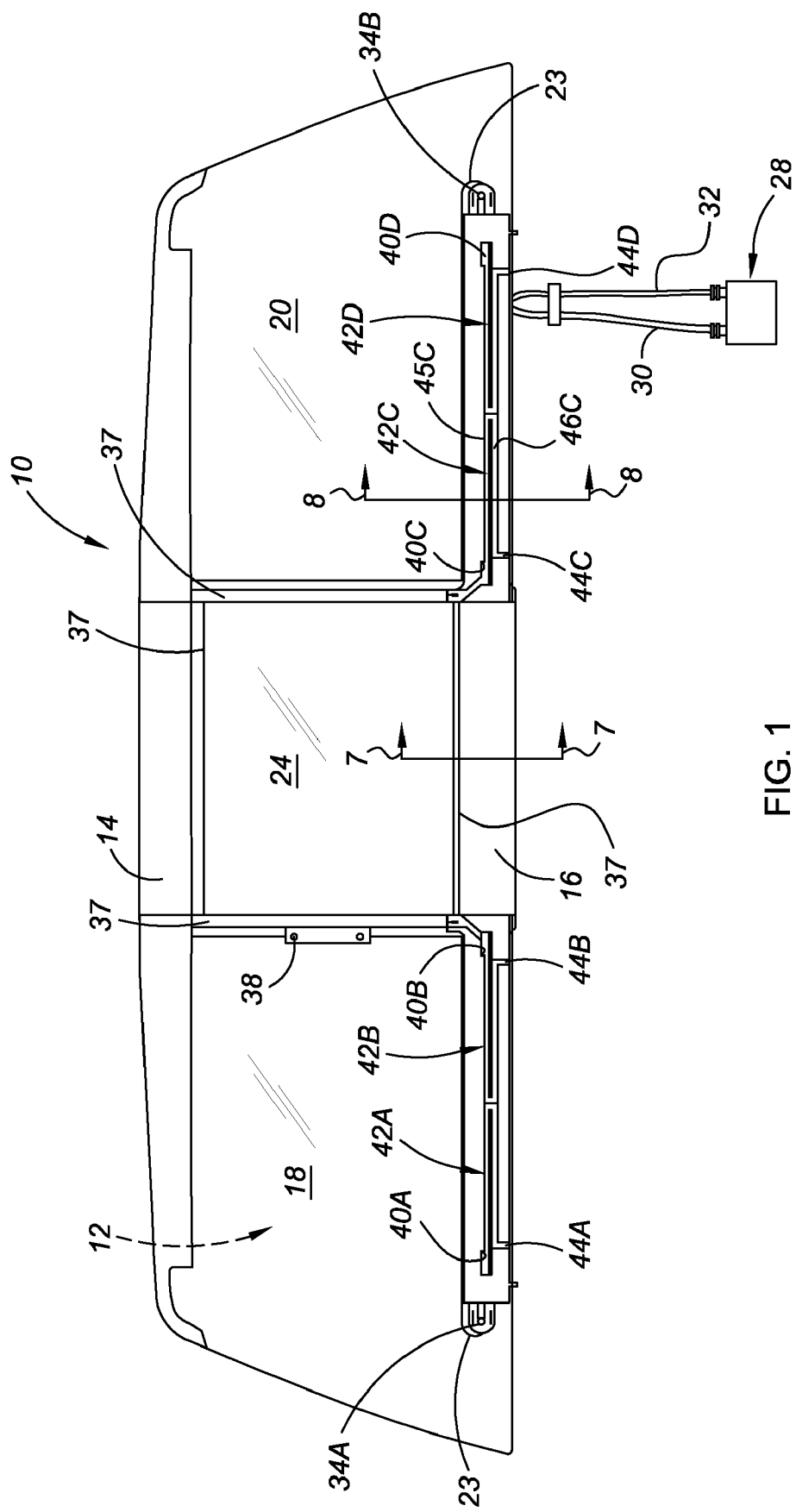
FIG. 1 is a schematic illustration in rear view of a vehicle window assembly having a first circuitous flow channel.

Referring to the drawings, wherein like reference numbers refer to like components, FIG. 1 shows a rear vehicle window assembly 10 for a pickup truck installed at the rear of a pickup cab to close off the interior compartment 12 of the cab. The interior compartment 12 is forward of the rear vehicle window assembly 10 in FIG. 1. The vehicle window assembly 10 includes an upper widow frame molding 14 and a lower window frame molding 16, also referred to as an upper and a lower rail, respectively. The moldings 14, 16 are preferably plastic.

Figure 10:
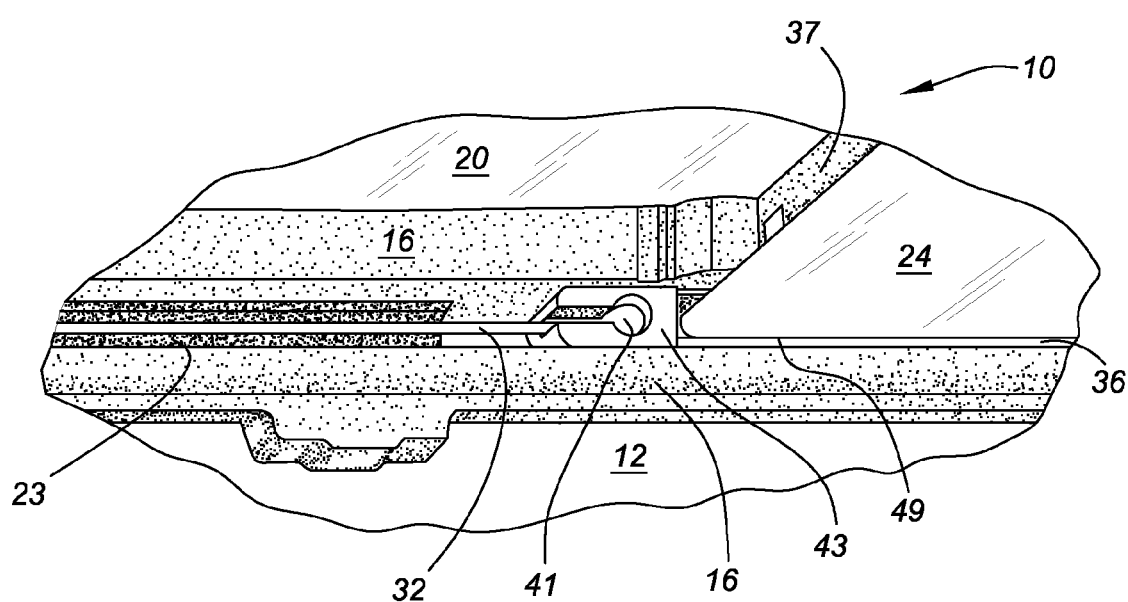
FIG. 10 is a schematic perspective illustration in fragmentary view of the vehicle window assembly of FIG. 1.

The rear vehicle window assembly 10 also includes a left stationary glass member 18 and a right stationary glass member 20 that are adhered to the upper and lower window frame moldings 14, 16 (forward of the moldings 14, 16 in FIG. 1), as discussed further below. A structural support member 23 preferably of extruded aluminum is partially visible on either side of the lower window frame molding 16. A movable (i.e., slidable) glass member 24 is shown in a closed position in FIG. 1 and is slidable to the right within a window channel 26 (shown in FIGS. 7 and 8) formed by the structural support member 23. The structural support member 23 forms the same channel 26 on the left side of the structural support member, forward of stationary glass member 18, but the movable glass member 24 does not slide in that portion of the channel 26, as explained below. The lower window frame molding 16 surrounds the structural support member 23 and window channel 26. Movable glass member 24 slides within the window channel 26 when powered by an electric motor and cable regulator assembly 28, shown in FIG. 1. The electric motor and cable regulator assembly 28 is drivingly connected to and rotatably powers a first cable 30, shown partially in FIG. 1. The first cable 30 is operatively connected to the center part of movable glass member 24, which drives a second cable 32 rotatable around pulleys 34A and 34B mounted at either end of the structural support member 23. As shown in FIG. 8, the second cable 32 moves within the channel 26. As shown in FIG. 7, a cable sheath 39 protects the portion of second cable 32 that is not within the channel 26. As shown in FIG. 10, a perspective view from inside of the interior compartment 12, an enlargement 41 secured to the end of the second cable 32 is secured within a keyed opening 43 formed at an end of the center glass carrier 36 to secure the second cable 32 to the center glass carrier 36. The other end of cable 32 and center glass carrier 36 are secured to one another in an identical manner. A lower surface 49 of the movable glass member 24 is adhered to the center glass carrier 36 such that movement of the center glass carrier 36 via cable 32 causes sliding movement of the movable glass member 24. Referring to FIG. 1, window seals 37 surround the edges of the opening closed off by the movable glass member 24. (The window seal 37 is also partially visible in FIG. 10.) A stop 38 prevents movement of the movable glass member 24 to the left of the position shown in FIG. 1. Another stop (not shown) in the lower rail also prevents movement of the movable glass member 24 to the left of the position shown in FIG. 1.

Water on the surface of the movable glass member 24 or water from outside of the interior compartment 12 may collect on the top of the lower window frame molding 16 and/or in channel 26, and therefore within the interior compartment 12, because the structural support member 23 and lower window frame molding 16 are forward of the glass members 18, 20 as shown in FIGS. 1, 3-6, and 8. In order to solve this problem, the lower window frame molding 16 is formed with fluid inlets 40A, 40B, 40C and 40D (see FIG. 1), also referred to as drains, in fluid communication with the structural support member 23 forward of the fluid inlets 40A-40D. The lower window frame molding 16 also forms separate circuitous flow channels 42A, 42B, 42C and 42D in fluid communication with the respective fluid inlets 40A, 40B, 40C and 40D to receive water from the inlets by gravity. The lower window frame molding 16 also forms fluid outlets 44A, 44B, 44C and 44D in fluid communication with the respective flow channels 42A, 42B, 42C and 42D that transport fluid from the flow channels 42A, 42B, 42C and 42D by gravity, out of the lower window frame molding 16 below the stationary glass members 18 and 20, which is outside of the vehicle interior compartment 12 (e.g., into a bed of the vehicle).

Figure 2:
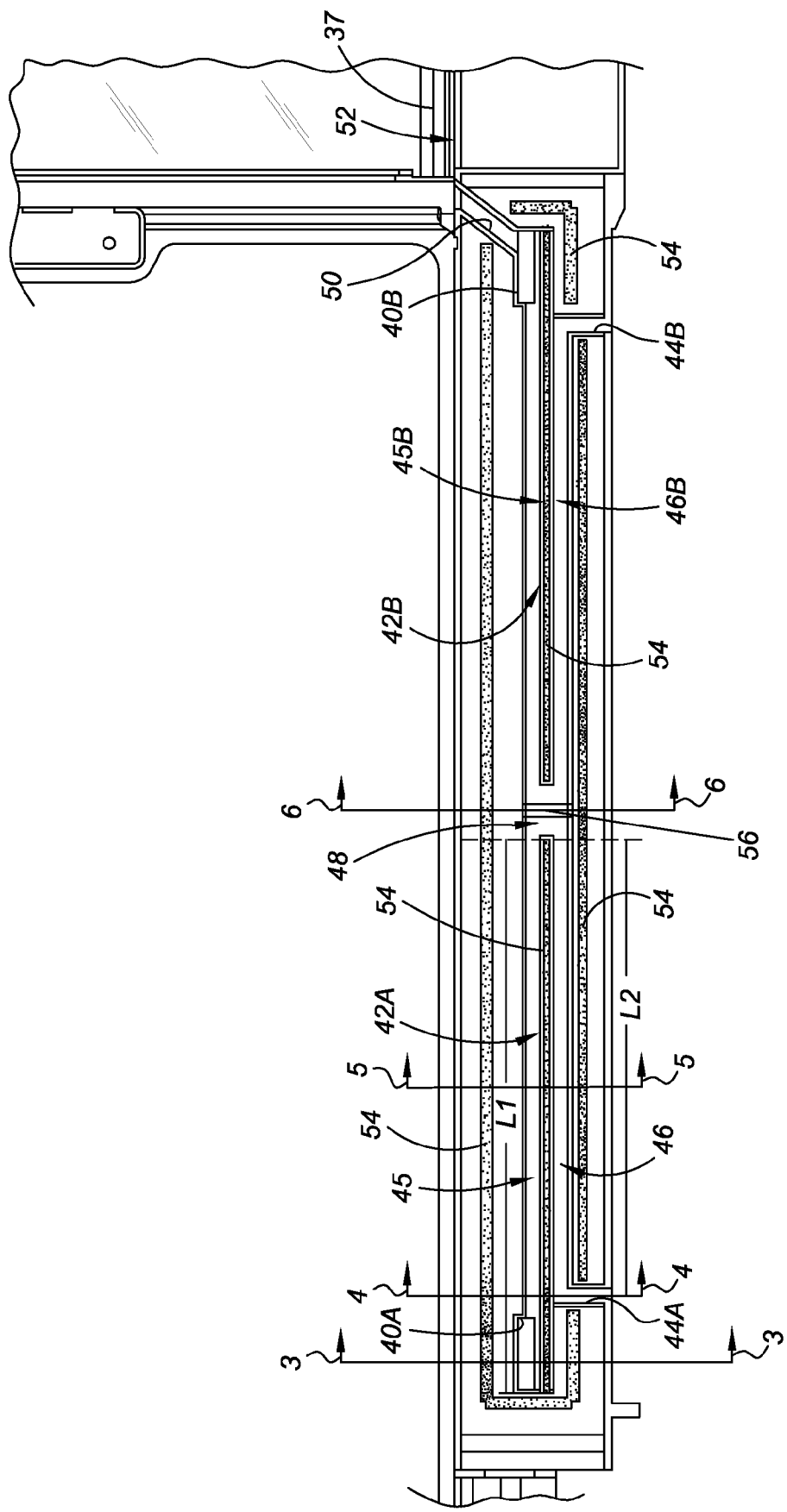
FIG. 2 is a schematic illustration in fragmentary rear view of a portion of the vehicle window assembly of FIG. 1.

Referring to FIG. 2, Fluid inlet 40A, flow channel 42A and fluid outlet 44A are described in detail. Flow channel 42B and its respective inlet 40B and outlet 44B, as well as flow channel 42C with inlet 40C and outlet 44C, inlet 40D and outlet 44D are each mirror images of flow channel 42A, inlet 40A and outlet 42A and therefore will not be separately described in detail. Flow channel 42A includes a first leg 45 that partially forms the inlet 40A, a second leg 46 that partially forms the outlet 44A, as well as a bend 48 that connects the first leg 45 with the second leg 46. The first and second legs 45, 46 are generally parallel with one another. A passage 50 drains an upper surface 52 of the lower window frame window molding 16 adjacent seal 37. In another embodiment, the passage 50 may be eliminated and the fluid outlets 44A and 44B may be moved slightly further apart from one another such that fluid outlet 44A aligns with the left edge of fluid inlet 40A (but is still only in communication therewith through flow passage 42A) while fluid outlet 44B aligns with the right edge of fluid inlet 40B (but is still only in fluid communication therewith through flow passage 42B).

The circuitous flow channel 42A directs water to flow from the inlet 40A, through first leg 45, around the bend 48 and then back down the second leg 46 to the outlet 44A. Thus, the flow channel 42A "doubles back on itself", i.e., reverses direction of flow, as water is routed in one direction (left to right) in leg 45 and then in an opposing direction (right to left) in leg 46, which is generally parallel to leg 45, in order to make it from the inside of the interior compartment 12 through inlet 40A to outlet 44A. Preferably, the overall length of the route from the inlet 40A to the outlet 44B is not less than 100 millimeters, as represented approximately by the length L1 of the first leg 45 from the inlet 40A to the bend 48 plus the length L2 of the second leg 46 from the bend 48 to the outlet 44A, plus the length between the centerlines of the legs 45, 46 at the bend 48, which is located approximately midway between the inlet 40A and the outlet 44A. The circuitous, doubling back of flow channel 42A with a length not less than 100 millimeters has shown to provide necessary fluid drainage from the inside of the compartment 12 to outside of the vehicle while not producing an undesirable level of wind or road noise in the compartment 12. A second flow channel 42B includes first leg 45B and second leg 46B connected at a bend and forming a mirror image of circuitous flow channel 42A.

A urethane adhesive seal 54 is placed at selected locations on the lower window frame molding 16 to adhere the molding 16 to the left stationary glass member 18, acting as a secondary wall therebetween. A symmetric pattern of urethane adhesive seal 54 is placed between the lower window frame molding 16 and the right stationary glass member 20 and is represented in cross-sectional view in FIG. 8. Notably, there is no adhesive or other type of seal between the stationary glass member 18 and separating wall 56 that separates the circuitous flow channel 42A from flow channel 42B, as is evident from FIGS. 1 and 6.

FIGS. 3-6 are cross-sectional views of the circuitous flow channel 42A of FIGS. 1 and 2 taken at the locations indicated in FIG. 2. Because the flow channels 40A-40D are symmetrical, the cross-sectional views of flow channel 42A are representative of the cross-sections of flow channels 42B, 42C and 42D, taken at like locations. The lower window frame molding 16 is a mirror image about its center (cross-section of FIG. 7) as is the structural support member 23 except that there are no ribs 58 (see FIG. 8) for supporting the center glass carrier 36 and sliding glass member 24 on the left half of the structural support member 23, as the glass member 24 does not slide to the left of the stop 38. FIG. 8 is a cross-sectional view of the flow channel 42C taken at the location indicated in FIG. 1.

Figure 3:
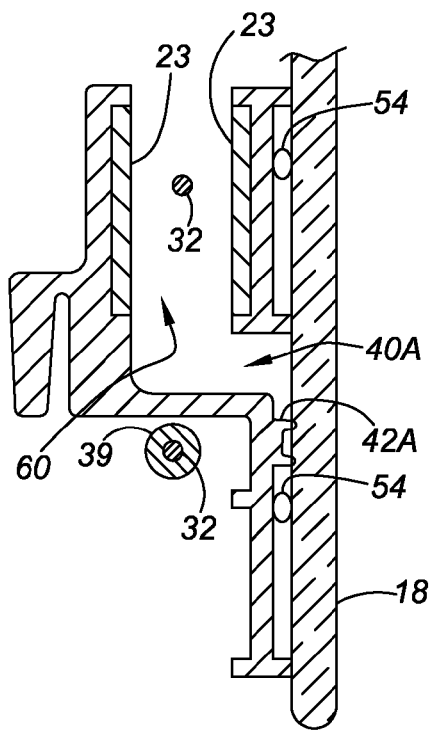
FIG. 3 is a schematic illustration in fragmentary view of the rear window assembly of FIG. 1 taken at the arrows indicated in FIG. 2.

Referring to FIG. 3, a cross-section taken through the center of fluid inlet 40A, shows an opening 60 at the bottom of structural support member 23 that aligns with and is in fluid communication with the fluid inlet 40A to allow water drainage into channel 42A.

Figure 4:
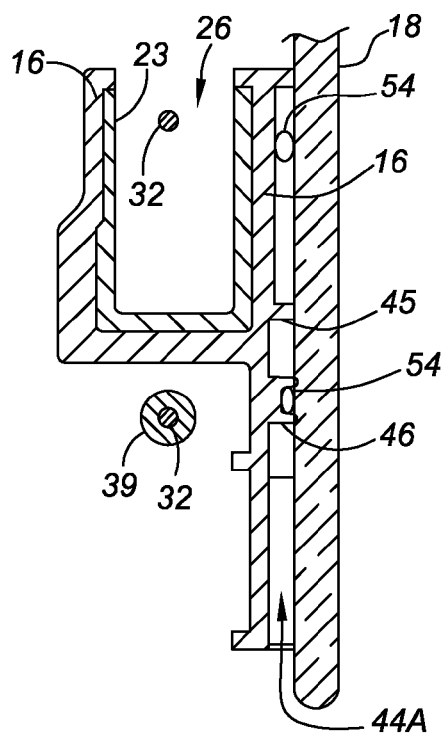
FIG. 4 is a schematic cross-sectional illustration in fragmentary view of the rear window assembly of FIG. 1 taken at the arrows 4-4 indicated in FIG. 2.
Figure 5:
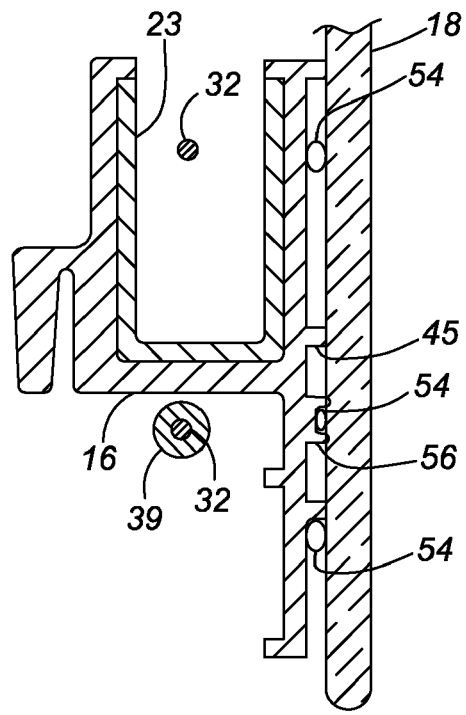
FIG. 5 is a schematic cross-sectional illustration in fragmentary view of the rear window assembly of FIG. 1 taken at the arrows 5-5 indicated in FIG. 2.

Referring to FIG. 4, the structural support member 23 has a closed-off U-shaped channel 26 at this location. First leg 45 is closed off and partially defined by the stationary glass member 18, while second leg 46 opens to fluid outlet 44A. Referring to FIG. 5, both legs 45 and 46 are closed off at this cross-section.

Figure 6:
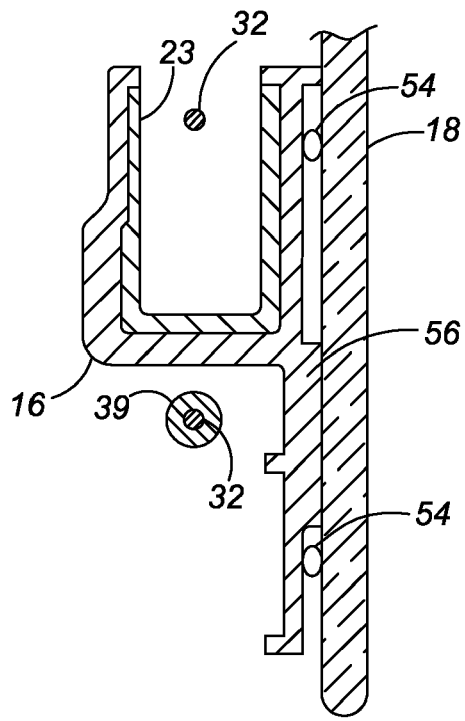
FIG. 6 is a schematic cross-sectional illustration in fragmentary view of the rear window assembly of FIG. 1 taken at the arrows 6-6 indicated in FIG. 2.

Referring to FIG. 6, the separating wall 56 abuts the stationary glass member 18, but is not sealed thereto. Accordingly, overflow from flow channel 42A to flow channel 42B or vice versa is possible by fluid passing between the glass member 18 and the separating wall 56 through the abutment.

Referring to FIG. 7, the movable glass member 24 is sealed at a lower portion thereof by flexible seal member 37. Seal 37 is secured by a seal support member 62 of extruded aluminum running parallel with the structural support member 23. Referring to FIG. 8, a first leg 45C and a second leg 46C of flow channel 42C (corresponding in function and arranged as a mirror image of first leg 45B and second leg 46B of flow channel 42B shown in FIG. 2) are closed off and partially defined by stationary glass member 20 at this cross-sectional location.

Referring to FIG. 9, an alternative flow channel 142A for use in the window molding 16 in lieu of flow channels 42A and 42B of FIG. 1 utilizes two fluid inlets 140A and 140B corresponding in function to fluid inlets 40A and 40B, both in fluid communication with a single fluid outlet 144B through flow channel 142A. Flow channel 142A includes first leg 145, second leg 146, and third leg 147. First leg 145 communicates fluid collected through fluid inlet 140B with bend 148 where the fluid turns and flows through second leg 146 to fluid outlet 144B. Fluid from fluid inlet 140A flows through third leg 147 to bend 148 where it flows out through second leg 146. Thus, legs 145 and 146 illustrates the flow channel 142A doubling back on itself. Preferably, the length L3 of the first leg 145 plus the length L4 of the second leg 146 plus the distance between the centerlines of the respective legs 145 and 146 (across which the fluid travels in bend 148) is not less than 100 millimeters. Also, the length L5 of third leg 147 plus the length L4 of second leg and the distance between the respective centerlines of the legs 146 and 147 across which fluid must flow in the bend 148 is not less than 100 millimeters. A flow channel that is a mirror image of flow channel 142A would be molded into the opposite side of lower window frame molding 16 (adjacent stationary glass member 20) in this embodiment.

While the best modes for carrying out the invention have been described in detail, those familiar with the art to which this invention relates will recognize various alternative designs and embodiments for practicing the invention within the scope of the appended claims.

The invention claimed is:

1. A vehicle window assembly comprising:
    a window frame molding defining:
        a fluid inlet;
        a fluid outlet;
        a circuitous flow channel that doubles back on itself and connects the fluid inlet with the fluid outlet to permit fluid flow through the molding; wherein the circuitous flow channel is a first flow channel, the fluid inlet is a first fluid inlet and the fluid outlet is a first fluid outlet;
    wherein the window frame molding further defines:
        a second fluid inlet;
        a second fluid outlet;
        a second circuitous flow channel that doubles back on itself and connects the second fluid inlet with the second fluid outlet to permit fluid flow through the window frame molding; and
        a separating wall separating the first flow channel from the second flow channel; and
    a stationary glass member abutting the window frame molding to further define the first and second flow channels; wherein the vehicle window assembly is characterized by an absence of sealing material between the separating wall and the stationary glass member.

2. The vehicle window assembly of claim 1, wherein the first flow channel includes a first leg forming the first fluid inlet, a second leg forming the first fluid outlet, and a bend connecting the first and second legs; and wherein the first and second legs are generally parallel with one another.

3. The vehicle window assembly of claim 2, wherein the first flow channel is characterized by a fluid flow path length between the first fluid inlet and the first fluid outlet of not less than 100 millimeters.

4. The vehicle window assembly of claim 1, further comprising:
    a structural support member partially surrounded by the window frame molding above the first flow channel; wherein the structural support member forms a window channel having an outlet opening in fluid communication with the first fluid inlet of the window frame molding; and
    a movable glass member supported by the structural support member and slidable within the window channel of the structural support member.

5. The vehicle window assembly of claim 1, further comprising:
    a seal between the stationary glass member and the window frame molding along at least a portion of the first flow channel.

6. A rear window assembly for a vehicle cab comprising:
    a window frame molding defining:
        a fluid inlet within an interior compartment of the vehicle cab;
        a fluid outlet outside of the vehicle cab; and
        a circuitous flow channel winding between and connecting the fluid inlet with the fluid outlet to permit fluid flow from the interior compartment to the outside of the cab through the window frame molding;
    wherein the flow channel includes:
        a first leg forming the fluid inlet;
        a second leg forming the fluid outlet;
        a bend connecting the first and second legs; wherein the first and second legs are generally parallel with one another with the second leg below the first leg and the fluid outlet opening at a lowest portion of the second leg such that fluid is not retained in the second leg; and wherein the bend is generally midway between the fluid inlet and the fluid outlet.

7. The rear window assembly of claim 6, wherein the flow channel is characterized by a fluid flow path length between the fluid inlet and the fluid outlet of not less than 100 millimeters.

8. The rear window assembly of claim 6, further comprising:
    a stationary glass member abutting the window frame molding to further define the flow channel;
    a structural support member partially surrounded by the window frame molding above the flow channel; wherein the structural support member forms a window channel having an outlet opening in fluid communication with the fluid inlet of the window frame molding; and
    a movable glass member supported by the structural support member and slidable within the window channel of the structural support member.

9. The rear window assembly of claim 6, further comprising:
    a stationary glass member abutting the window frame molding to further define the flow channel; and
    a seal between the stationary glass member and the window frame molding along at least a portion of the flow channel.

* * * * *